March 19, 1940.  C. H. STEVENSON  2,193,846
METHOD OF CONTROLLING THE CONDITION OF A MEDIUM
Filed Aug. 12, 1938
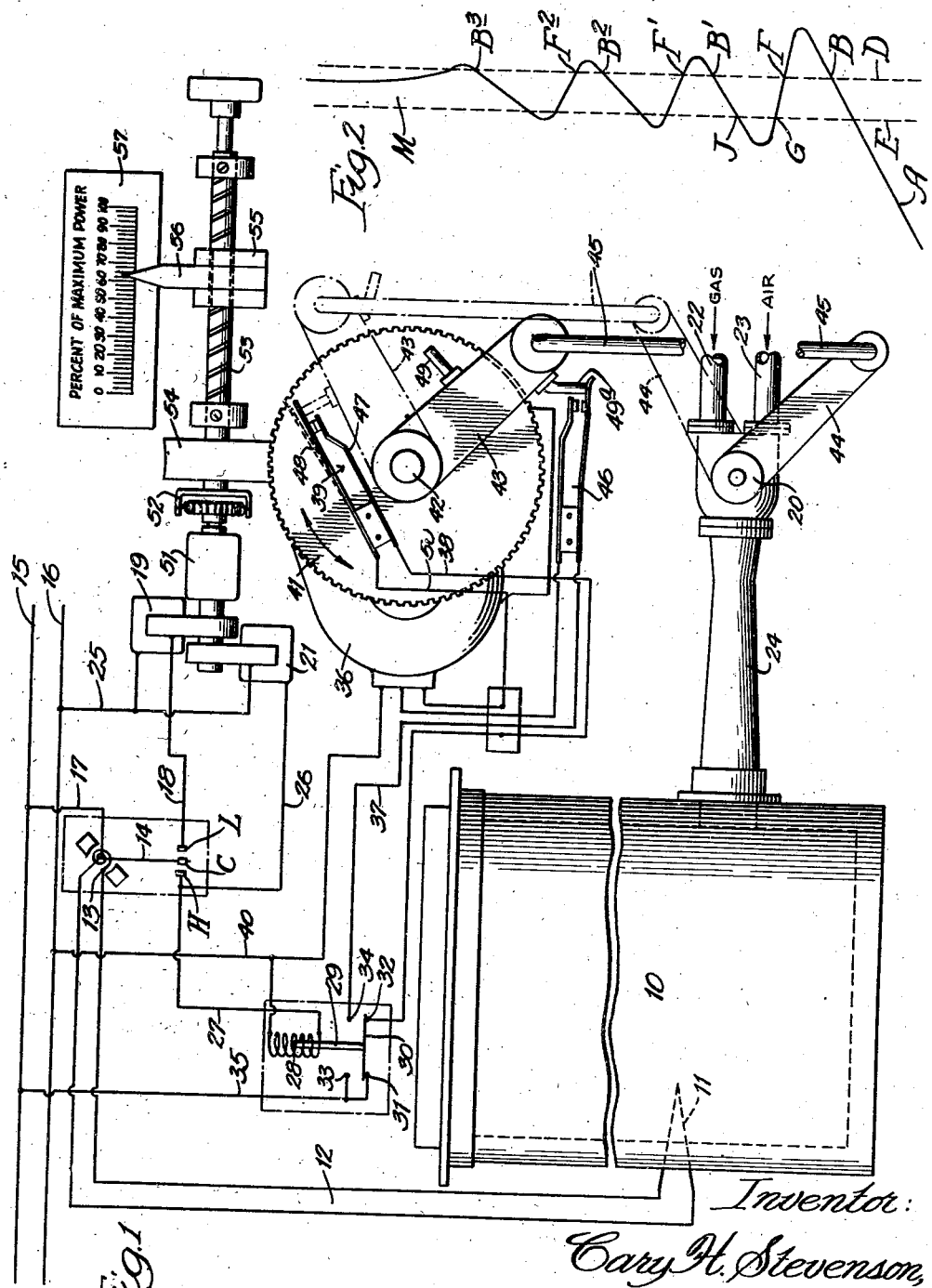
Inventor:
Cary H. Stevenson,
By Simmons & Simmons
Attorneys.

Patented Mar. 19, 1940

2,193,846

UNITED STATES PATENT OFFICE 2,193,846

METHOD OF CONTROLLING THE CONDITION OF A MEDIUM

Cary H. Stevenson, Chicago, Ill., assignor to Lindberg Engineering Company, Chicago, Ill., a corporation of Illinois Application August 12, 1938, Serial No. 224,457

3 Claims. (Cl. 236—15)

This application is a continuation in part of application Serial No. 97,444, filed August 22, 1936.

The method of the present invention is intended to afford an automatic control for a medium such as the heat admitted into a heating furnace or for otherwise controlling the physical or chemical condition, or volume of a physical substance, or an attribute or quality thereof, but for present purposes and in order to more clearly define the nature of the present invention, I shall explain the details of the present method as applied to a heat treating furnace in which it is desired to maintain the temperature at a substantially uniform degree despite variations in the depletion of the heat due to changes in the load conditions or in the gas pressure or other variable factors which attend the operation of an apparatus of this character.

The method of the present invention differs from others with which I am familiar, in that it makes provision for the accurate measurement of any excess or deficiency in temperature during a relatively short period, and recurrently resets the valve or other control member in ratio thereto through a series of diminishing fluctuations until substantially stable conditions are attained.

In measuring the excess of the temperature or other variable factor with accuracy, I find it first of all necessary to make provision for the complete cutting off of the incoming supply of gas or the like, and thereafter, through a time interval which is predetermined by the excess, to subject the valve to a readjustment of proper amount to compensate against readmission of a like excess of gas and to suspend the readmission of gas in reduced amount until the temperature falls into a predetermined control range, after which gas in reduced amount is again admitted to the furnace until the temperature rises above the control range, upon which the excess is again measured and the valve further restricted in proportionate amount, which successive closing, readjustment and opening of the valve will continue through a range of reducing fluctuations until an adjustment is obtained which maintains the temperature within the control range, which thus terminates the period of recurrent adjustments until further substantial fluctuations in temperature occur as a result of changing conditions which require a repetition of the adjusting operations.

In order to carry out the operations above enumerated it is necessary first of all to employ an element which is responsive to changes in the conditions of the medium under control, and in the case of a furnace, a thermocouple, delicately responsive to changing conditions, will be employed, although it will be understood that where a medium of different character is employed, a suitable responsive element adapted to such conditions will be substituted in place of the thermocouple.

In order to utilize a thermocouple or the like, it is necessary to establish a control range of a few degrees variation, having high and low limits and including the intended temperature as the medial condition. Such a control range is necessary to permit the responsive device at the high and low levels of the control range to set in motion the proper appliances provided for acting at the respective degrees of temperature or the like represented by the high and low limits of the control range.

When the high limit is registered by the thermocouple, mechanisms will be actuated which serve promptly to cut off any additional supply of gas during the period of measurement of the excess heat and readjust the valve controls to reset the valve for a lesser admission of gas. Similarly, when the thermocouple attains the lower limit of the control range, mechanisms are actuated for admitting gas in greater amount, until through a series of such fluctuations the stable conditions are attained.

It has been found from experience that accurate regulation of the gas valve or similar controlling device cannot be made so long as the gas is being admitted during the period of readjustment, since the inflow of gas during this interval introduces a disturbing factor which makes it impossible to accurately measure the excess heat previously admitted, so that the present invention is designed to effect the necessary measurement of excess during the interval while the valve is closed and while the thermocouple measures the amount of temperature in excess of the upper limit of the control range and the mechanisms employed are properly timed to effect the necessary readjustment of the valve control mechanism during this interval, without, however, opening the valve itself until the temperature falls into the control range, after which the valve is opened in a reduced amount determined by the previous setting of the valve control mechanism.

In this way the necessary adjustments are effected in properly timed relation, so that after a few fluctuations, due to the presence of variable factors, an accurate adjustment is ultimately attained which admits gas in an amount just sufficient to compensate for the heat depletion in the furnace and promptly effects a readjustment whenever the depletion rate is disturbed by increasing or diminishing the load of materials introduced into the furnace for heat treatment, or by other factors which determine the supply of gas which must be admitted to maintain the intended temperature.

In order to more fully point out the nature of the present method as applied to a heat treating furnace, reference is had to the accompanying drawing, wherein, Figure 1 is a diagrammatic view showing a heat treating furnace with the valve mechanisms and controls actuated through electrical circuits; and Fig. 2 is a greatly magnified view of a graph produced upon a record strip traveling forward at uniform speed and representing the control range with an undulating line inscribed thereon by a stylus and representing changes in temperature as indicated by the movements of the thermo-couple.

It will, of course, be understood that the present mechanism is illustrative only, and that electrical circuits are employed merely as a matter of convenience for the transmission of the required movements, and that pneumatic circuits or mechanical connections might readily be employed in lieu of those shown in the drawing.

As illustrated, the method is applied to a heat treating furnace 10 of the character employed for the heat treatment of metallic objects such as springs, shafts, tubes or the like, which require a heat treatment through a properly computed period and at a controlled temperature. In order to register variations in temperature, a thermocouple 11 of any suitable character is employed, which is connected through circuit wires 12 with a galvanometer 13 or the like of a character well understood in the art, which actuates a swinging arm 14 in either of two directions, depending upon the rise or fall of the temperature.

The swinging arm carries a contact C, which upon a rise in temperature is positioned to engage the contact H, and upon the fall in temperature to engage the contact L. When the temperature in the furnace is within the restricted control range of a few degrees, the swinging arm 14 will occupy the medial position shown and be out of engagement with the contacts H and L.

Electricity is supplied from a power line which comprises the wires 15 and 16. The swinging arm 14 is connected with the wire 15 through a lead 17. The contact L is connected through a wire 18 with a coil 19, of reversing motor 51, which when energized serves to establish conditions permitting an increased opening of the valve 20, and the coil 19 acts in opposite direction to a companion coil 21, which when energized operates, through proper controls, to reduce the extent of the valve opening.

In Figure 1, the closing position of the valve is indicated in full lines, and a partially opened position is indicated in dotted lines. The valve controls the admission of gas and air through pipes 22 and 23 to a burner 24 connected with the furnace.

In view of the fact that the companion coils 19 and 21 act oppositely to respectively establish an increased or diminished valve opening, these coils may be properly referred to respectively as the valve increasing and the valve reducing coils, and it is by properly timing the energizing of these respective coils in ratio to a measured deficiency or excess in heat, as the case may be, that it is possible to properly set the controls which govern the opening of the valve at the proper time and in the proper amount to correct the error and establish and maintain the intended conditions.

The valve reducing coil 21 operates during the interval that the swinging contact C engages the contact H by reason of an excess of temperature in the furnace above the control range, and this coil is connected with the power line 16 through a lead 25 which also connects with the valve increasing coil 19. The coil 21 is also connected by a circuit wire 26 to the contact H, and to a wire 27 which leads to a coil 28 surrounding a pole piece 29 which carries an armature 30, the arrangement being such that when the swinging contact C engages the contact H upon an excessive rise of temperature, the coil 28 will be energized and the armature 30 lifted to open a circuit through contacts 31 and 32 and establish a circuit through contacts 33 and 34.

The contacts 31 and 33 are connected with a circuit wire 35 which connects with the line wire 15. The contacts 32 and 34 are connected with a valve actuating motor 36 through circuit wires 37 and 38, the former of which makes direct connection with the motor, and the latter of which is connected through a limit switch 39, and which is operated through a time interval controlled by the coils 19 and 21, so that the position of the limit switch will correct the conditions of previous deficiency or excess of heat in the furnace, as the case may be, in a manner presently to be described in detail.

The motor 36 is a reversing motor and is connected with the line wire 16 through a return wire 40 which is common to either of the circuits established through the wires 37 and 38 for energizing the motor in the proper manner to operate the valve in the intended direction and to the extent permitted by the limit switches 39 and 46. The limit switch 39 is carried by a worm gear 41 which is freely mounted upon the shaft 42 of the motor 36, and the shaft has keyed thereon an arm 43 which is connected with the valve arm 44 through a link 45, so that when the valve operating motor 36 is energized to operate in the proper direction, the arm 43 will be rapidly shifted through the range of movements permitted by the adjustable limit switch 39 which permits a variable opening of the valve, and a fixed limit switch 46 which breaks the motor circuit at the instant the valve has reached its closed position.

The limit switch 39 comprises spring contact fingers 47 and 48, the latter of which overhangs the former and is adapted to be lifted by the contact of a plunger 49 carried by the arm 43, so that, as soon as the valve has been opened to a previously computed extent, the circuit will be broken and the motor will stop. A second plunger 49ª on the arm coacts with the limit switch 46 in a similar way. The circuit wire 38 leads to the finger 47 and cooperates with a return wire 50 leading to the motor, so that, when the motor is energized in a valve opening direction, the circuit will be established as follows: From line wire 15 through wire 35, contacts 31 and 32, armature 30, and contact wire 38, contact fingers 47 and 48, and wire 50, through the motor, with the return to line wire 16 established through the wire 40.

The circuit for closing the valve is established as follows: From line wire 15 through wire 35, contact 33, armature 30, contact 34, and wire 37, through the limit switch 46, to the motor, with the return through the wire 40 to the line wire 16.

The worm gear 41 which carries the limit switch 39 is rotated at a predetermined slow rate by either the valve increasing coil 19 or the valve reducing coil 21, which impart motion through a reversing motor 51 and friction clutch 52 to a threaded shaft 53 which also carries a worm 54 in mesh with the worm gear 41. The threaded shaft carries a rider 55 having a pointer 56 which registers with the markings on a gage plate 57 inscribed to indicate the percentage of opening of the valve at any given position of the pointer.

Operation

In use, the regulating movements of the above mechanism are reflected upon the graph shown in Fig. 2, in which the sinuous record line A represents changes in temperature as measured by the thermocouple. The record line traverses and intersects a control zone M having an upper limit represented by the dotted line D and a lower limit represented by the dotted line E.

The ideal condition toward which the regulation tends is represented by the upper flattened end of the graph line which lies wholly within the control zone. As the temperature rises, the line A will traverse the control zone and intersect the upper limit line D at the point B. This represents the maximum of the control zone temperature and the point at which the swinging contact C will engage the contact H, thereby establishing a circuit through the coil 28 which lifts the pole piece 29 with its armature 30 and establishes a circuit through the wires 35, 37 and 40, which is the valve closing circuit and operates to quickly close the valve by the fall of the arm 43 to the position shown in full lines in Fig. 1. This immediately shuts off all further supply of gas to the furnace, and initiates the measuring period during which the excess temperature over and above the control zone is registered in a readjustment of the limit switch 39 by a clockwise movement to bring the contact fingers 47 and 48 to a lower position than previously, so that on the next opening valve movement the valve will open to a lesser degree than previously.

The excess temperature entering the furnace after the valve has been closed is represented on the graph by the first peak lying beyond the upper limit line D and between the points B and F. F represents the point at which the excess heat has been exhausted and the temperature again falls to the upper limit of the control zone, at which point the swinging contact C will move away from engagement with the contact H and thus terminate the limit switch adjusting operation effected by the energizing of the valve reducing motor 21 during the interval of time represented on the graph line D between the points B and F. Since the motor when energized operates at a uniform speed, the length of this line B—F represents the period of time during which the limit switch is being adjusted in a clockwise direction and the extent of that adjustment. From the above it will be evident that the time consumed in the adjustment of the limit switch and hence the extent of its adjustment is commensurate with the period of time required to dissipate the excess of heat represented by the peak between B and F.

The disengagement of the contacts C and H also deenergizes the coil 28, allowing the armature 30 to drop and establishing circuits from the line 15, through 35, 31, 30, 32, 38, 47, 48, 50 and 40, to the line 16, thereby opening the valve to the extent permitted by the previously adjusted limit switch. Despite the instant opening of the valve, the temperature may continue to fall through the left hand peak represented between G and J, but will ultimately begin to rise and continue rising until the record line traverses the control zone at the point B', at which point the valve will be promptly closed and the period of time required to dissipate the excess of temperature between the points B' and F' will result in the moving of the limit switch again in the closing direction but to a lesser extent, as represented by the ratio between the lines B—F and B'—F'.

Again the temperature may fall below the control zone and again rise above the control zone, with a further and lesser adjustment of the limit switch, until by alternating stages a final adjustment of proper degree is reached which will eliminate the fluctuations and cause the temperature to remain within the control zone, as indicated by the final straight line of the graph beyond the final fluctuations represented at $B^3$.

It will be seen from the foregoing that the fluctuations represented by the peaks above the control zone progressively diminish in extent, and that the corresponding adjustments of the limit switch become more and more delicate, until an exact ratio is established between the input of heat into the furnace and the depletion thereof, so that after a short interval of time the valve will be accurately adjusted to constantly supply the required amount of heat to compensate for the depletion thereof.

If an over correction results, adjustments occur on the low side of the control zone. During the interval between G and J, the heating rate is advanced to counteract an over correction of the limit switch by a counter-clockwise movement of the required extent, and similarly in the following cases in which the record line falls below the lower limit line E.

Theoretically, it might be possible, by the first measuring off of the time required to dissipate the excess in the amount of heat, and by reducing the admission of gas in ratio thereto, to accurately adjust the valve. This might be possible if the speed of the correcting motor 51 were attuned exactly to the particular furnace, and no variables were present in gas pressure, operating temperatures, loading, and so forth, since in the absence of such variable factors the time for the excess amount of temperature to be absorbed would correspond exactly to the computed adjustment of the valve. Due to practical conditions, however, it is seldom possible to exactly adjust the valve on the first correction, and diminishing fluctuations will thereafter occur until the correct adjustment is attained as the resultant of the closing and opening movements of the valve occasioned as the temperature rises above or falls below the control zone, although in some cases, if the first correction has not been sufficient, the temperature may rise a second time without even touching the low point of the control zone.

The ultimate adjustment will thus, in most cases, be the resultant of alternate closing and opening movements of the limit switch during time intervals commensurate with the condition of the furnace during the period of regulation, although it will be understood that the adjustments effected on the high side of the control range will be mainly relied upon, because such adjustments are computed during an interval, or substantially so, while the gas supply is entirely turned off, since the closing of the valve will occur promptly as compared with the relatively long period of time during which the limit switch is being actuated.

On the low side of the control zone, however, the opening movement of the limit switch will immediately occasion a further opening of the valve which will follow the movements of the limit switch during the interval of time measured by the length of the record line G—J, which represents the period during which the limit switch is being retracted by a counter-clockwise movement.

The width of the control zone represents the medial position within which the swinging contact C is out of engagement with either the contact H or L, so that, during this interval, neither of the adjusting motor coils 19 and 21 is energized, so that no adjustment of the limit switch will be effected during the interval of the temperature in the control zone.

The invention is one which so times the adjusting operation as to effect a more accurate measurement of the extent of readjustment required to dissipate an excess in the amount of heat occasioned by a previous adjustment than would be possible if the adjusting operation were performed during an interval of time while disturbing influences were present, or in conformity with any system which seeks to immediately readjust the valve to a new setting without first closing off the heat supply and thereafter timing the period required to dissipate the excess as a gage whereby to definitely determine the repositioning of the mechanism which controls the resetting of the valve.

As before stated, the mechanism here shown serves simply to illustrate the application of the present method to the control of temperature in a heat treating furnace, but in view of the fact that the method is applicable to numerous and diversified conditions, it is thought desirable to define certain of the terms employed in the appended claims.

It will therefore be understood that the term "medium" is intended to define any substance, material, or agency, which is subject to measurable fluctuation, either in quantity, or in its physical, chemical, or electrical attributes, by reason of variations in the inflow as compared with the depletion to which the medium is subjected.

The term "conditioning factor" refers to the admitted substance or agency, whether physical, chemical or electrical, which serves to replenish the medium to compensate for depletions therefrom, whether the conditioning agency be in the nature of an additional supply of the same substance of which the medium is composed, or whether it be a physical, chemical or electrical attribute, which qualifies or modifies the state of the medium.

The term "responsive" has reference to an element or agency which is influenced in measurable degree by the conditions within the medium, and which is capable, through appropriate means, of controlling said conditions and of maintaining a state of substantial stability or uniformity therein at the intended level.

The term "control zone" has reference to a limited but permissible range of fluctuations within the medium between upper and lower limits which include the desired level and having a sufficient range to enable the responsive element or agency to be selectively actuated when conditions within the medium attain the upper or lower limits of the control zone, as the case may be.

The term "upper and lower" as related to the control zone has reference to the presence of a greater or lesser quantity of the conditioning factor, whatever it may be, and does not necessarily refer to a greater or lesser degree of temperature, since the upper limit of the control zone might properly indicate the lowest permissible temperature as in the case of a refrigerant in which an excess of the refrigerant would be represented by a lower degree of temperature, while a deficiency in a refrigerant would be represented by a higher degree of temperature. It will thus be understood that in all cases the term "upper and lower" has proper relationship to the character of the conditioning agent, although in the regulation of a furnace of the character particularly described the term "upper and lower" would of necessity correspond to a greater or lesser degree of temperature, while in the case of a refrigerant the term "upper and lower" would bear inverse ratio to the temperature.

The term "valve" is intended to refer to any appropriate element or agency adapted to regulate the admission of the conditioning factor in the amount required to maintain stable conditions within the medium.

The appended claims are intended to cover and define any system of the general character described, which conforms to the language of the above definitions.

I claim:

1. The method of maintaining a stable condition in a medium at a substantially even level within the limits of a restricted control zone, which consists in admitting a conditioning factor at a predetermined rate until the upper limit of the control zone is reached, promptly shutting off the supply of the conditioning factor at the upper limit and maintaining it shut off while the condition of the medium remains above said limit, measuring the excess amount of condition within the medium according to the time said condition remains above said upper limit and providing for the subsequent readmission of said conditioning factor in a reduced amount dependent upon the measurement, again admitting the conditioning factor in such reduced amount as soon as the condition within the medium falls to the upper limit of the control zone by reason of the dissipation of the previous excess of the conditioning factor, increasing the rate of admission of the conditioning factor while the condition of the medium remains below the lower limit of the control zone, and continuing said operations by stages which cause the condition of the medium to progressively approach the desired level by diminishing fluctuations until a stable condition within the control zone is attained.

2. The method of maintaining a stable condition in a medium at a substantially even level within the limits of a restricted control zone, which consists in admitting a conditioning factor at a predetermined rate until the upper limit of the control zone is reached, promptly shutting off the supply of the conditioning factor at the upper limit and maintaining it shut off while the condition of the medium remains above said upper limit, measuring during said shut off period the excess amount of said condition within the medium due to the previous admission of said conditioning factor by timing the interval required for the condition to again descend to the upper limit of the control zone and providing for the subsequent readmission of said conditioning factor in an amount reduced in ratio to said time interval, again admitting the conditioning factor in such reduced amount as soon as the condition within the medium falls to the upper limit of the control zone by reason of the dissipation of the previous excess of the conditioning factor, increasing the rate of admission of the conditioning factor while the condition of the medium remains below the lower limit of the control zone, and continuing said operations by stages which cause the conditioning of the medium to progressively approach the desired level by diminishing fluctuations until a stable condition within the control zone is attained.

3. The method of maintaining a substantially stable condition in a medium, which comprises first supplying a condition factor to said medium at a predetermined and substantially even rate within the limits of a restricted control zone, promptly shutting off the supply of said conditioning factor to said medium when the upper limit of said zone is reached, maintaining said supply shut off during the time the condition in said medium exceeds said upper limit, diminishing the succeeding supply rate according to the length of time the supply is shut off and again supplying the conditioning factor to said medium in such reduced amount when the condition in said medium falls to said upper limit, increasing the rate of supply of the conditioning factor while the condition of said medium remains below the lower limit of the control zone, and alternately continuing the adjusting operations for said supply until a substantially stable condition within the control zone is attained.

CARY H. STEVENSON.